N. D. GOFF.
ATTACHING LINK.
APPLICATION FILED FEB. 16, 1914.
1,154,987.
Patented Sept. 28, 1915.
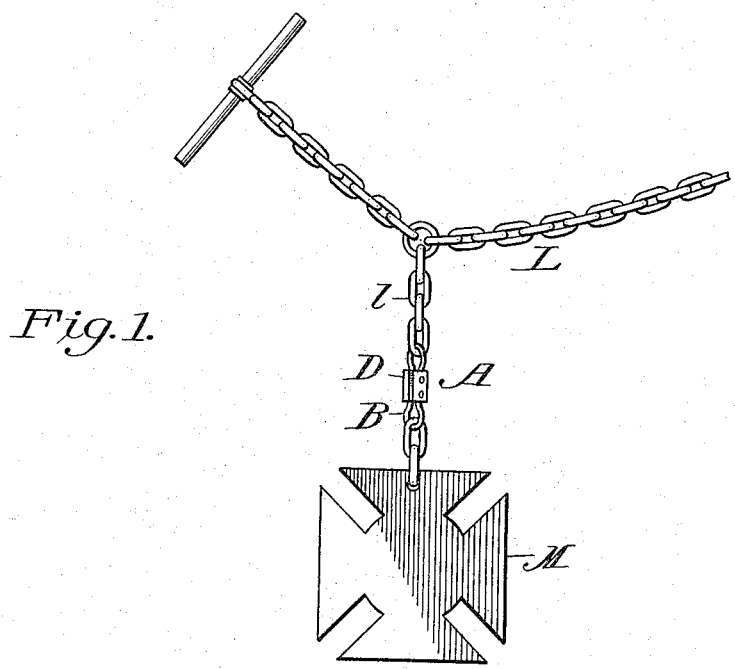
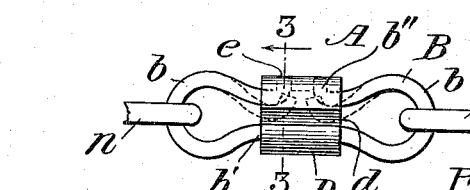
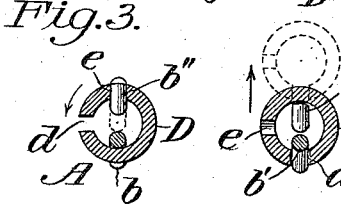
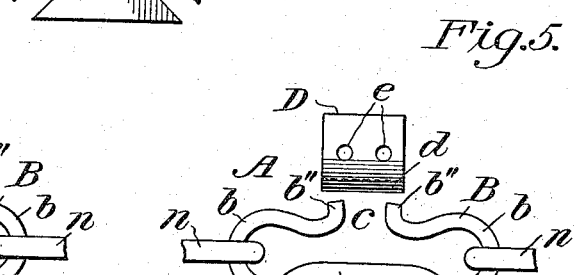
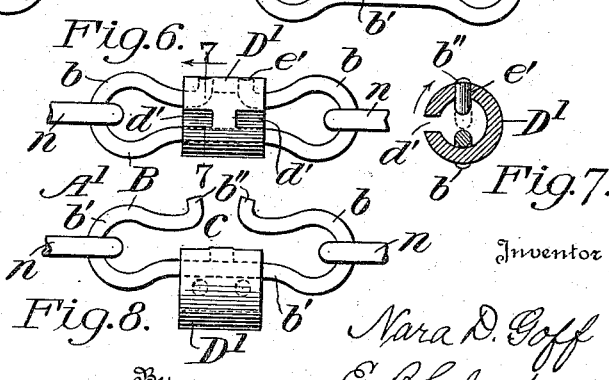
Witnesses
Fenton N Belt
C. M. Walker.
Inventor
Nara D. Goff
By E. S. Clark
Attorney

UNITED STATES PATENT OFFICE.

NARA D. GOFF, OF CLINTON, IOWA.

ATTACHING-LINK.

1,154,987.

Specification of Letters Patent. Patented Sept. 28, 1915.

Application filed February 16, 1914. Serial No. 818,902.

*To all whom it may concern:*

Be it known that I, NARA D. GOFF, a citizen of the United States, residing at Clinton, in the county of Clinton and State of Iowa, have invented certain new and useful Improvements in Attaching-Links, of which the following is a specification.

This invention relates to attaching links adapted for attaching a watch or a charm to a chain or for connecting the links of any chain together.

The object of my invention is to provide an attaching link and hook device of simple construction, having a slotted and detachable band or collar, by means of which the link may be opened or securely closed.

My improved link may be used for attaching watches and charms to a main chain and for other purposes in the jewelers' art.

The matter constituting my invention will be defined in the claims.

The details of construction of my attaching link will be understood by reference to the accompanying drawing, in which—

Figure 1 represents a side view of a chain and charm, showing the attaching link in position. Fig. 2 represents a side view of the link on an enlarged scale. Figs. 3 and 4 represent cross sections on the line 3—3, Fig. 2, the band or collar being in different positions. Fig. 5 represents a side elevation showing the members of the link detached, one from the other. Fig. 6 represents a side view of a link having a band or collar of modified construction. Fig. 7 represents a cross section thereof on line 7—7, Fig. 6. Fig. 8 represents a side view with the collar partly detached.

In constructing my attaching link A I provide a spring wire member B and a detachable band or collar D or D¹, of gold or other suitable metal. The member B is made of spring wire or other resilient material, and for convenience is called the spring wire member. This member B is made of a single piece of wire and is of made elongated form and has at its ends enlarged resilient loops $b$ which are connected by a reduced elongated middle portion $b'$, at one side of which are the ends of the wire spaced apart as shown in Fig. 5. The free ends of the wire extending inward from the end loops $b$ are turned outward to form short projections or engaging studs $b''$, and spaced apart to form an opening $c$ between them.

The band or collar member D, shown in Figs. 1 to 5 inclusive, is of suitable length and diameter to inclose the reduced middle portion $b'$ of member B and give a neat pleasing appearance, and serves as a keeper for securing and closing the link. The collar D is made with a longitudinal slot $d$ of suitable width to permit the passage through it of one strand or thickness of the member B, and with two holes $e$, which are in line lengthwise and spaced apart the proper distance to receive the engaging studs $b''$. The holes $e$ are preferably placed in longitudinal line about one quarter of the circumference of the collar away from the slot $d$, as shown in Figs. 2 and 3, though the distance and arrangement may be varied. In Figs. 2 and 3 the studs $b''$ are engaged in the holes $e$ and the link is closed, while in Fig. 4 the studs are shown disengaged and the collar D turned one quarter around so that the spring member may be passed out through the slot $d$. The dotted lines in Fig. 4 indicate the manner in which the collar may be lifted off or detached from the spring wire member. When it is desired to connect the member B, at either end-loop $b$, within another link, as $n$, the studs $b''$ may be pressed inward out of their holes and then turned into the slot $d$, when another link or a ring may be slipped over a stud into one of the loops $b$; then the collar may be turned a quarter around and the studs again engaged with their holes, thus closing the link. Of course, a separate link or ring may be connected with each end loop $b$ as above described.

In Fig. 1 my attaching link A is shown connecting by its end-loops with a charm M and with the links $l$ of a chain L. The end-loops $b$, being resilient, will force the studs $b''$ into the holes $e$ when the parts are turned to register, and will hold the studs in place, and the link closed. In my attaching link it is important to provide a resilient loop at each end and two engaging studs, spaced apart, so that it may be connected with another link or a ring at either end, or at both ends.

In Figs. 6, 7 and 8, a slightly modified form of band or collar D¹ is shown, having two end-slots $d'$, one at each end, so as to leave a solid central part of the collar between them, as shown in Fig. 6. The collar is thus made stronger and can readily be manipulated so as to free the studs through the end-slots as indicated in Fig. 8, thus permitting other links to be attached to the loops *b*. This modified construction is within the spirit and scope of my invention.

What I claim as new, and desire to secure by Letters Patent, is—

1. An attaching link composed of a spring wire member having resilient end-loops and an elongated, reduced middle portion, the ends of the wire being turned outward to form engaging studs and spaced apart in the reduced middle portion, and a band or collar member having two holes for receiving said studs and slotted in a plane different from the plane of the holes for permitting the stud of either end-loop alone to be disengaged from said collar, for engaging with a ring or link and then reëngaged in a hole in said collar.

2. An attaching link composed of a spring wire member having enlarged resilient end-loops and an elongated, reduced middle portion, the ends of the wire being turned outward to form engaging studs and spaced apart in the reduced middle portion, and a band or collar member having two holes for receiving said studs and opposite end-slots in a plane different from the plane of the holes for permitting the studs of the end-loops to be disengaged from said collar, for engaging with a ring or link and then reengaged with the holes in said collar.

3. An attaching link composed of a spring wire member having resilient end-loops and an elongated, reduced middle portion, the ends of the wire being turned outward to form engaging studs and spaced apart in the reduced middle portion, and a band or collar member having two holes for receiving said studs and a longitudinal slot in a plane different from the plane of the holes for inserting or removing the spring wire member and permitting either end-loop alone to be engaged with a separate ring or link.

In testimony whereof I affix my signature in presence of two witnesses.

NARA D. GOFF.

Witnesses:
ANETA P. RASMUSSEN,
WILLIAM L. DIECKMANN.

Copies of this patent may be obtained for five cents each, by addressing the "Commissioner of Patents, Washington, D. C."